(12) United States Patent
Szikszay

(10) Patent No.: US 6,287,056 B1
(45) Date of Patent: Sep. 11, 2001

(54) METHOD OF OPERATING A PULSE FLOW CONVEYING INSTALLATION AND PULSE FLOW CONVEYING INSTALLATION FOR CARRYING OUT THE METHOD

(75) Inventor: Georg Szikszay, Lauchringen (DE)

(73) Assignee: Gericke AG, Regensdorf (CH)

( * ) Notice: Subject to any disclaimer, the term of this patent is extended or adjusted under 35 U.S.C. 154(b) by 0 days.

(21) Appl. No.: 09/196,133

(22) Filed: Nov. 20, 1998

(30) Foreign Application Priority Data

Nov. 21, 1997 (CH) .................................................. 2699/97

(51) Int. Cl.⁷ .................................................. B65G 53/00
(52) U.S. Cl. .............................. 406/197; 406/14; 406/30; 406/85; 406/127; 406/146
(58) Field of Search ................................. 406/14, 30, 85, 406/127, 146, 197

(56) References Cited

U.S. PATENT DOCUMENTS

| | | | |
|---|---|---|---|
| 3,604,758 | * 9/1971 | Flain ...................................... | 302/24 |
| 4,545,410 | * 10/1985 | Paul et al. ............................... | 406/30 |
| 4,775,267 | * 10/1988 | Yamamoto ............................... | 406/50 |
| 6,085,939 | * 7/2000 | Geweke et al. ......................... | 406/14 |

* cited by examiner

*Primary Examiner*—Christopher P. Ellis
*Assistant Examiner*—Joe Dillon, Jr.
(74) *Attorney, Agent, or Firm*—Finnegan, Henderson, Farabow, Garrett & Dunner, L.L.P.

(57) ABSTRACT

In a method of operating a pulse flow conveying installation (10), which is intended for the conveying of a solid material (33), present in the form of bulk material, by means of a conveying gas, in which pulse flow conveying installation (10) an alternating sequence of solid material pulses (27) and conveying gas pulses (28) is generated by first means (13, . . . , 21) in the conveying conduit (25) and is pressed through the conveying conduit (25), choking is reliably prevented in that the conveying pressure is regulated, and in that to regulate the conveying pressure in the conveying conduit (25), the quantity of the conveying gas flowing on a time average basis through the conveying conduit (25) is altered in relation to the quantity of the solid material conveyed on a time average basis through the conveying conduit (25).

7 Claims, 1 Drawing Sheet

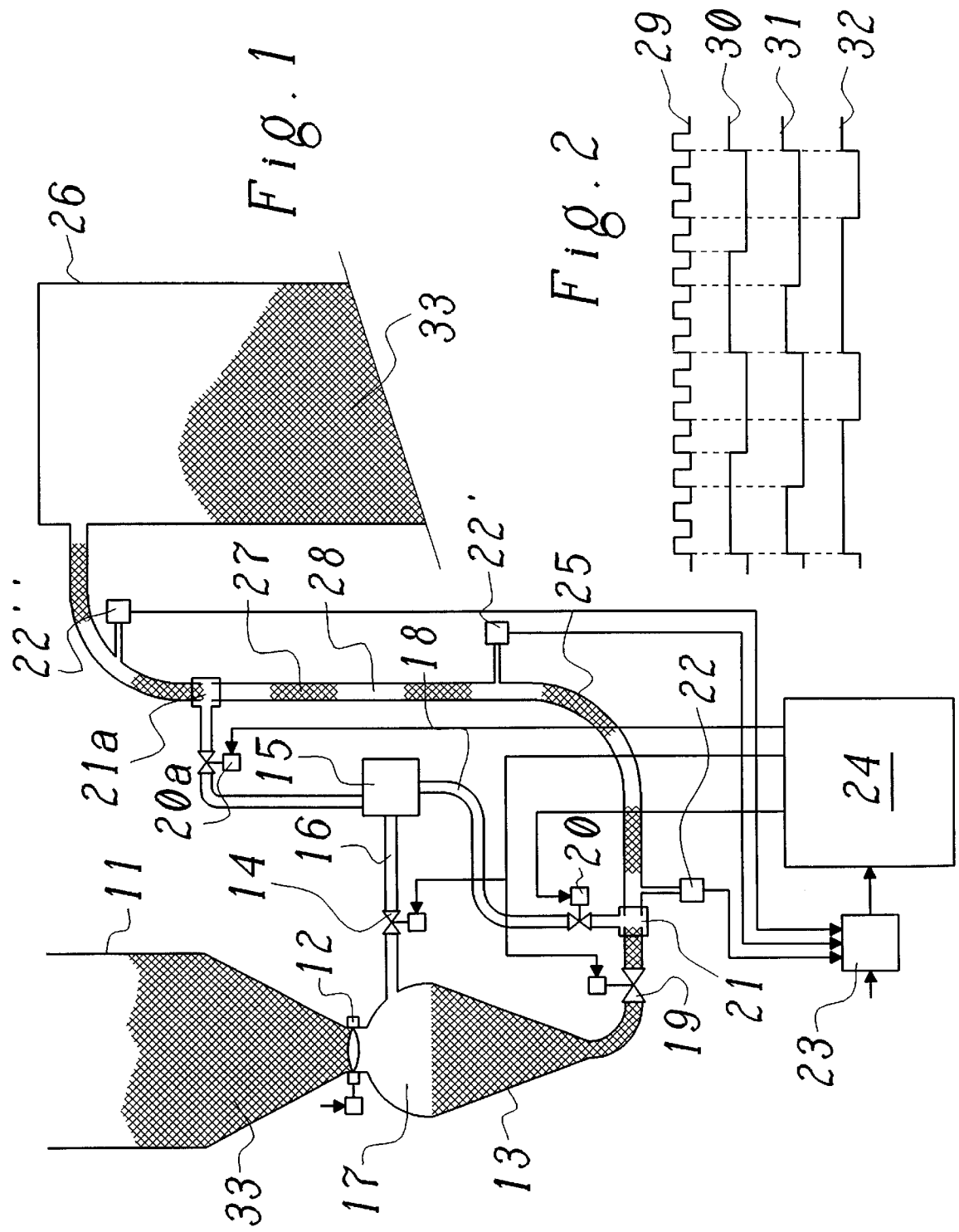

METHOD OF OPERATING A PULSE FLOW CONVEYING INSTALLATION AND PULSE FLOW CONVEYING INSTALLATION FOR CARRYING OUT THE METHOD

TECHNICAL FIELD

The present invention relates to the field of conveying technology. It relates to a method for operating a pulse flow conveying installation which is intended for the conveying of a solid material, present in the form of bulk material, by means of a conveying gas, in the case of which pulse flow conveying installation an alternating sequence of solid material pulses and conveying gas pulses is generated by first means in the conveying conduit and pressed through the conveying conduit.

The invention further relates to a pulse flow conveying installation for carrying out the method, comprising a device, connected to the inlet of a conveying conduit, for introducing the solid material into the conveying conduit, which introduction device can be filled with the solid material to be conveyed and introduces it in controlled fashion into the conveying conduit, and further comprising a pulsator which is connected to the conveying conduit downstream of the introduction device in the direction of conveying and by means of which the conveying conduit can be acted upon, via a first controllable valve, by a pressurized conveying gas.

Such a method and such an installation are known, for example, from the brochure No. 573/2 of the applicant.

PRIOR ART

In known pulse flow conveying installations (pulse flow conveying systems), pulverulent or granular bulk materials are fed through pipes to a destination location by means of compressed air (or another pressurized conveying gas). In this case, by means of pulses induced by air injection, the solid materials are conveyed in pulse form through the pipe. A solid material pulse is followed by an air pulse, and vice versa. As a result of the air injection, the conveying pressure is reduced and the conveying capacity is set.

Now in practice—as a result of alterations in the pulse movement in relatively long pipes—it is possible for conveying conditions to occur which, with unaltered injection conditions, give rise to a slight increase in the conveying pressure or a large pressure increase with choking. In the event of the occurrence of such choking, the conveying process is interrupted and it is necessary for the choking to be eliminated. This leads to an undesired interruption in operation and additional maintenance expenditure.

SUMMARY OF THE INVENTION

It is accordingly the object of the invention to specify a method of operating a pulse flow conveying installation, in which method the danger of choking is recognized in due time and the pressure increases in the conveying conduit which lead to choking are automatically eliminated.

In the case of a method of the initially mentioned type, the object is achieved in that the conveying pressure is regulated, and in that, to regulate the conveying pressure in the conveying conduit the instantaneous volume flow of the conveying gas flowing through the conveying conduit is altered in relation to the instantaneous volume flow of the solid material conveyed on a time average basis through the conveying conduit. As a result of the regulation, according to the invention, of the conveying pressure, a permanent increase in the conveying pressure and a concomitant choking are automatically prevented. If a pressure increase is detected, the operational parameters of the installation are altered to the end that the pressure increase is eliminated and the conveying pressure is restored to its normal value. In this case, to perform the regulation use is made of the finding that the pressure loss in the conveying conduit is, in characteristic fashion, dependent on the matter of what is the ratio of the volume flow of the conveying gas flowing through the conveying conduit to the volume flow of the solid material conveyed through the conveying conduit. If the volume flow ratio is increased, the pressure loss or the conveying pressure falls. In contrast, if the volume flow ratio is reduced, the pressure loss increases.

A first preferred embodiment of the method according to the invention is distinguished in that to alter the quantity of conveying gas the length of the generated solid material pulses and/or conveying gas pulses in the conveying conduit is altered, in that for the generation of a solid material pulse solid material is pressed into the conveying conduit from a sender filled with solid material by means of conveying gas in a first temporal cycle, in that for the generation of a conveying gas pulse conveying gas is pressed into the conveying conduit via a pulsator in a second temporal cycle, and in that to alter the conveying pressure in the conveying conduit the ratio of the first temporal cycle to the second temporal cycle is altered. This results in a particularly simple and effective regulation of the conveying pressure.

A second preferred embodiment of the invention is characterized in that the conveying pressure in the conveying conduit is progressively measured, in that the measured value of the conveying pressure is compared with a predetermined theoretical value, and in that the ratio of the first temporal cycle to the second temporal cycle is reduced if the measured value is greater, beyond a predetermined first limiting value, than the theoretical value, and in that the ratio of the first temporal cycle to the second temporal cycle is increased if the measured value is smaller, beyond a predetermined second limiting value, than the theoretical value.

In practice, it has proved to be effective in this case if, according to a preferred further development of this embodiment, the predetermined theoretical value is selected in such a way that in disturbance-free normal operation the achieved conveying pressure corresponds to the theoretical value within the predetermined limiting values with a ratio of the first temporal cycle to the second temporal cycle of approximately 1, and that, on exceeding the first limiting value, the temporal cycle ratio is reduced to a value smaller than 1, until the conveying pressure again undershoots the first limiting value, and that, on undershooting the second limiting value, the temporal cycle ratio is increased to a value greater than 1, until the conveying pressure again exceeds the second limiting value.

The pulse flow conveying installation, according to the invention, of the initially mentioned type is characterized in that at least one pressure pickup to measure the conveying pressure in the conveying conduit is disposed at the conveying conduit, and in that, to drive the introduction device and the first valve, a control device is present, which is operatively connected to the pressure pickup and alternately drives the introduction device and the first valve as a function of the measured conveying pressure.

A preferred embodiment of the installation is distinguished in that a comparator is disposed between the at least one pressure pickup and the control device, and in that the regulating unit is designed in such a way that it drives the introduction device and the first valve with temporal cycle ratios which can be switched over.

Further embodiments are evident from the dependent claims.

BRIEF EXPLANATION OF THE FIGURES

The invention is to be explained in greater detail, in the text which follows, by reference to illustrative embodiments in conjunction with the drawing. In the drawing:

FIG. 1 shows in a diagrammatic representation a preferred illustrative embodiment of an installation for carrying out the method according to the invention; and FIG. 2 shows an illustrative impulse diagram appertaining to the control of the temporal cycles or pulse lengths in an installation according to FIG. 1.

WAYS OF IMPLEMENTING THE INVENTION

FIG. 1 reproduces, in a diagrammatic representation, a preferred illustrative embodiment of an installation for carrying out the method according to the invention. In the present example, the pulse flow conveying installation 10 comprises a sender 13, which is designed as a downwardly conically tapering vessel and is connected, on the outlet side, via a controllable valve 19 to a conveying conduit 25. In place of the sender 13 with the valve 19, it is of course also possible to provide other known devices for introducing solid material into the conveying conduit 25, such as for example a bucket wheel charging device or a double flap charging device. The pulse flow conveying installation 10 further comprises a pulsator 21, which is disposed, in the conveying direction (at a distance of approximately 1 m from the sender 13) downstream of the valve 19 at the conveying conduit 25, and makes possible the injection of conveying gas or compressed air into the conveying conduit 25. To this end, the pulsator 21 is connected via a controllable valve 20 and a gas conduit 18 to a conveying gas source 15 (e.g. a compressed air generator). The sender 13 is, for its part, connected in the upper part via a controllable valve 14 and a gas conduit 16, to the conveying gas source 15. The sender 13 also has at the top an opening, which is closable by a controllable filling flap 12 and through which, from a hopper type filling device 11 disposed thereabove, the solid material 33 to be conveyed can be filled into the sender 13 or replenished at certain time intervals. In the example shown, the conveying conduit 25 ends in a container 26, into which the solid material (the bulk material) is to be conveyed.

The two gas and air connections at the sender 13 and at the pulsator 21 are, in operation, alternately acted upon cyclically (by opening the associated valve 14 or 20) with the conveying gas or the conveying air from the conveying gas source 15. If the valve 14 is open (and the valve 20 is closed), the bulk material which has been filled in the vessel of the sender 13 is set into movement by the pressure in the gas space 17 and pressed through the conical end into the conveying conduit 25. In this case, it is self-evident that the valve 19 must be open and the filling flap 12 must be closed. If the valve 20 is open (and the valve 14 is closed), conveying gas (compressed air) is injected via the pulsator 21 into the conveying conduit 25. There thus arise in the conveying conduit 25 alternately sequential solid material pulses 27 and conveying gas pulses 28, which, by reason of the expansion of the gas, move along the conveying path with increasing speed through the conveying conduit 25 from the sender 13 to the container 26. The lengths of the pulses 27 and 28 are dependent upon the temporal cycles at which the valves 14 and 20 are driven or, respectively, opened and closed. If the temporal cycle $T_s$ in which the valve 14 is open is lengthened, the length of the solid material pulse 27 increases, and vice versa. If the temporal cycle $T_p$ in which the pulsator valve 20 is open is lengthened, the length of the conveying gas pulse 28 is increased, and vice versa.

The ratio of the temporal cycles $T_s/T_p$ now determines the matter of in which volume flow ratio conveying gas and solid material are conveyed through the conveying conduit. If the temporal cycle ratio increases, more solid material is conveyed; if the temporal cycle ratio falls, more conveying gas is pressed through the conveying conduit 25. It is now possible, with due consideration being given to the physical inter-relationships appertaining to the pulse flow conveying, to derive a functional inter-relationship between the temporal cycle ratio $T_s/T_p$ and the pressure drop Dp in the conveying conduit 25, which inter-relationship has the following form:

$$Dp=f(T_s/T_p)=A(T_s/T_p)^\epsilon$$

with a factor A and a constant $\epsilon$ which is smaller than 1. It is evident from the functional inter-relationship that the pressure drop Dp in the conveying conduit, i.e. the conveying pressure, increases as the temporal cycle ratio $T_s/T_p$ increases, and vice versa.

This dependence is now utilized for the purpose of automatically regulating the conveying pressure and thus preventing choking in the conveying conduit 25, which is heralded by an excessively increased conveying pressure. To this end, one or more pressure pickups 22, 22' are disposed at suitable positions at the conveying conduit 25, which pickups progressively monitor and measure the pressure prevailing in the conveying conduit. The measured pressure values are passed to a comparator 23, which compares the measured pressure values with a predetermined theoretical value. For the deviation of the measured pressure values from the theoretical value, a tolerance range is at the same time filed, which is specified by a first upper limiting value and a second lower limiting value. If the measured pressure values exceed the first upper limiting value, the comparator 23 emits a first control signal to a downstream control device 24. If the measured pressure values undershoot the second lower limiting value, the comparator 23 emits a second control signal to the control device 24. If the measured pressure values fall back to within the tolerance range, the comparator 23 emits a third control signal to the control device 24. Via appropriate control lines, the control device 24 controls the opening and closing of the valves 14 and 20 which control the supply of conveying gas or compressed air to the sender 13 and pulsator 21 respectively, with the corresponding temporal cycles $T_s$ and $T_p$. In this case, the control is based, for example, on a cycle impulse sequence 29 as has been reproduced in FIG. 2. In the normal condition of operation, a temporal cycle ratio $T_s/T_p$ of approximately 1 (normal value) is preferably used. The valve 14 is then controlled, for example, in accordance with the control impulse sequence 30 (FIG. 2), in the case of which the valve 14 is alternately opened for the length of three cycle impulses and closed for the length of three cycle impulses. The associated control impulse sequence for the valve 20 is inverse to the control impulse sequence 30.

If it is now indicated to the control device 24 by a first control signal from the comparator 23, that the conveying pressure has risen above the predetermined first limiting value, the control device 24 switches over from the control impulse sequence 30 to the control impulse sequence 31, in the case of which the valve 14 is only open for the length of two cycle impulses, while it remains closed for the length of four cycle impulses.

Since the associated control impulse sequence for the valve 20 is inverse to the control impulse sequence 31, the valve 20 is opened for the length of four cycle impulses and closed for the length of two cycle impulses. The temporal cycle ratio $T_s/T_p$ is then smaller than 1 and, in this case, preferably amounts to only 0.5, but can also be chosen to be different. According to the abovementioned functional inter-relationship between the pressure drop in the conveying conduit 25 and the temporal cycle ratio $T_s/T_p$, the pressure drop or the conveying pressure is reduced by the lowering of the temporal cycle ratio. If, subsequently, the measured pressure falls again to within the tolerance range, the control device 24 receives a third control signal from the comparator 23 and the temporal cycle ratio is reset again to the normal value of approximately 1.

If it is indicated to the control device 24 by a second control signal from the comparator 23 that the conveying pressure has fallen below the predetermined second limiting value, the control device 24 switches over from the control impulse sequence 30 to the control impulse sequence 32, in the case of which the valve 14 is open for the length of four cycle impulses, while it remains closed for a length of only two cycle impulses. Since the associated control impulse sequence for the valve 20 is inverse to the control impulse sequence 31, the valve 20 is opened for a length of two cycle impulses and closed for a length of four cycle impulses. Accordingly, the temporal cycle ratio $T_s/T_p$ is greater than 1 and, in this case, preferably amounts to 2, but can also be chosen to be different. According to the abovementioned functional inter-relationship between the pressure drop in the conveying conduit 25 and the temporal cycle ratio $T_s/T_p$, the pressure drop or the conveying pressure increases as a result of the increase in the temporal cycle ratio. If the measured pressure subsequently falls again to within the tolerance range, the control device 24 receives a third control signal from the comparator 23 and the temporal cycle ratio is reset again to the normal value 1. In place of a normal value of approximately 1, it is however also possible to choose a different normal value within the range between 0.5 and 2.

An additional reduction in the risk of choking in the conveying conduit 25 can be achieved by the use of further pulsators 21a along the conveying conduit 25 (in FIG. 1, by way of example, one further pulsator 21a is indicated, but a whole series is conceivable, which can be distributed along the entire conveying conduit 25). In combination with pressure pickups 22" which are disposed in the vicinity, in particular preferably downstream of the respective further pulsator 21a, it is thus possible to detect local conveying pressure fluctuations immediately and in particular to combat these at the place where they arise. If, by way of example, a distinct increase in the conveying pressure is measured in a region by a pressure pickup 22" fitted in the vicinity of the further pulsator 21a, then, in addition to the changes to the control of the first pulsator 21 (as described above) additional conveying gas can be pressed locally into the conveying conduit 25 via the further pulsator 21a in the pertinent region, and, in this way, choking of the conveying conduit 25 can be counteracted in this region. This may be achieved most simply in that, in the event of an increase in the conveying pressure during the second temporal cycle $T_p$, the additional opening takes place of those further valves 20a within the region of which the pressure pickups 22" measure a local increase in the conveying pressure. How great the quantity of conveying gas injected at the respective pulsator 21a is may be optimally set as a function of the dimensionings of the conveying conduit 25, the nature of the bulk material 33 and the conduct of the transport, and it is additionally conceivable that the cyclic time control of the further valves 20a chosen to be different from that of the first valve 20.

The described control and regulation procedures relate to the phase of normal operation, in which phase a continuous conveying takes place in a steady state. During the pressure build-up phase at the start of conveying and during the expansion phase at the end of conveying, the regulation does, in contrast, automatically shut down.

The control device can readily be constructed by a person skilled in the art of electronic control, so that a more detailed description can be dispensed with here. In particular, it is conceivable and advantageous to use, within the control device, a microprocessor which, by means of appropriate software, executes the described control and regulation procedures.

| LIST OF DESIGNATIONS | |
|---|---|
| 10 | pulse flow conveying installation |
| 11 | filling device |
| 12 | filling flap |
| 13 | sender |
| 14 | second valve (sender) |
| 15 | conveying gas source |
| 16 | gas conduit (sender) |
| 17 | gas space (sender) |
| 18 | gas conduit (pulsator) |
| 19 | valve (conveying conduit) |
| 20 | first controllable valve (pulsator) |
| 20a | further controllable valve |
| 21 | first pulsator |
| 21a | further pulsator |
| 22, 22', 22" | pressure pickup |
| 23 | comparator |
| 24 | control device |
| 25 | pipe |
| 26 | container |
| 27 | solid material pulse |
| 28 | conveying gas pulse |
| 29 | temporal impulse sequence |
| 30, . . . , 32 | control impulse sequence |
| 33 | solid material (bulk material) |

What is claimed is:

1. Method of operating a pulse flow conveying installation, which is intended for the conveying of a solid material, present in the form of bulk material, by means of a conveying gas, in which pulse flow conveying installation an alternating sequence of solid material pulses and conveying gas pulses is generated by first means in a conveying conduit and in a device for introducing solid material and is pressed through the conveying conduit, characterized in that the conveying pressure is regulated, and in that, to regulate the conveying pressure in the conveying conduit, at least one of the instantaneous volume flow of the conveying gas flowing through the conveying conduit and the instantaneous volume flow of the solid material conveyed through the conveying conduit is altered in relation to the other.

2. Method according to claim 1, characterized in that to alter at least one of the instantaneous volume flow of the conveying gas and the instantaneous volume flow of the solid material, at least one of the length of the generated solid material pulses and the length of the conveying gas pulses in the conveying conduit is altered.

3. Method according to claim 2, characterized in that to generate a solid material pulse solid material is pressed into the conveying conduit from an introduction device filled with solid material, by means of conveying gas, in a first temporal cycle, in that to generate a conveying gas pulse conveying gas is pressed into the conveying conduit via a first pulsator in a second temporal cycle, and in that to regulate the conveying pressure in the conveying conduit the ratio of the first temporal cycle to the second temporal cycle is altered.

4. Method according to claim 3, characterized in that the conveying pressure in the conveying conduit is progressively measured, in that the measured value of the conveying pressure is (compared with a predetermined theoretical value, and in that the ratio of the first temporal cycle to the second temporal cycle is reduced if the measured value is greater, beyond a predetermined first limiting value, than the theoretical value, and in that the ratio of the first temporal cycle to the second temporal cycle is increased if the measured value is smaller, beyond a predetermined second limiting value, than the theoretical value.

5. Method according to claim 4, characterized in that the predetermined theoretical value is selected in such a way that in disturbance-free normal operation the measured conveying pressure corresponds to the theoretical value within the predetermined limiting values with a ratio of the first temporal cycle to the second temporal cycle of approximately 1, and in that on exceeding the theoretical value by more than the first limiting value the temporal cycle ratio is reduced to a value smaller than 1 until the measured conveying pressure no longer exceeds, beyond the first limiting value, the theoretical value, and in that on being smaller than the theoretical value by more than the second limiting value the temporal cycle ratio is increased to a value greater than 1 until the measured conveying pressure again is no longer smaller than the theoretical value by more than the second limiting value.

6. Method according to one of claims 3 to 5, characterized in that at least one further pulsator is disposed downstream of the first pulsator in the conveying direction, and in that, in the event of an increase in the conveying pressure in the conveying conduit in the vicinity of one of the further pulsators, conveying gas is pressed via this further pulsator into the conveying conduit.

7. Method according to claim 6, characterized in that the injection of conveying gas into the conveying conduit takes place via the further pulsator during the second temporal cycle.

* * * * *